July 21, 1953  J. P. ECKERT, JR., ET AL  2,646,501
SIGNAL RESPONSIVE DEVICE
Filed Oct. 21, 1950  2 Sheets-Sheet 1

INVENTORS:
JOHN W. MAUCHLY
JOHN PRESPER ECKERT JR.

ATTORNEY

July 21, 1953   J. P. ECKERT, JR., ET AL   2,646,501
SIGNAL RESPONSIVE DEVICE
Filed Oct. 21, 1950   2 Sheets-Sheet 2
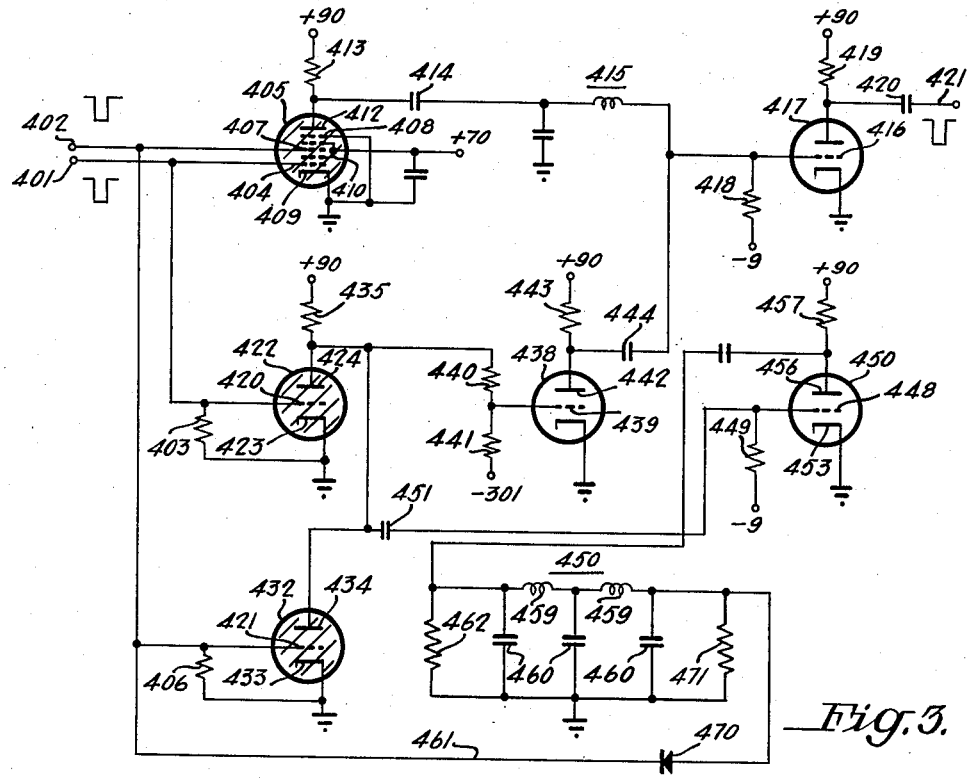
Fig. 3.
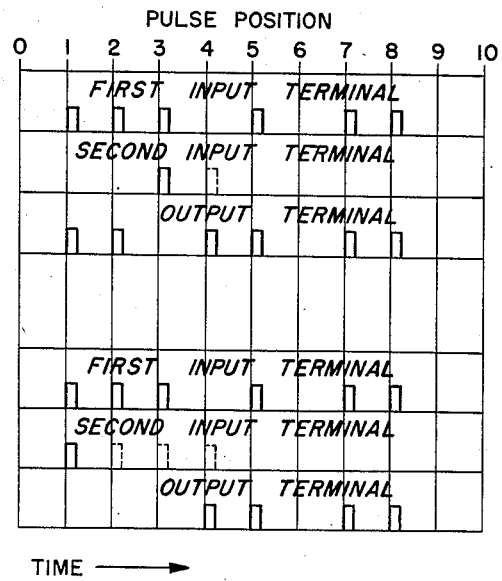
Fig. 4A.
Fig. 4B.
TIME ⟶
INVENTORS.
JOHN W. MAUCHLY
JOHN PRESPER ECKERT JR.
ATTORNEY Patented July 21, 1953

2,646,501

UNITED STATES PATENT OFFICE 2,646,501

SIGNAL RESPONSIVE DEVICE

John Presper Eckert, Jr., Gladwyne, and John W. Mauchly, Ambler, Pa., assignors to Eckert-Mauchly Computer Corporation, Philadelphia, Pa., a corporation of Pennsylvania Application October 21, 1950, Serial No. 191,402

9 Claims. (Cl. 250—27)

This invention relates to apparatus jointly responsive to impulse groups arriving over a plurality of channels and more particularly to an impulse responsive network of the type delivering at its output a signal reflecting properties present in all its input channels.

This invention provides an apparatus responsive to impulses or trains of impulses which arrive over a plurality of channels. The apparatus does not respond to each impulse individually, but to each group of impulses delivered concurrently by the several channels. The output impulse or impulses produced by the apparatus is determined by the energizing impulse group. In this way the apparatus produces a response which is a signal impulse or train of impulses uniquely reflecting the properties of the impulses or trains of impulses arriving over the signal channels.

Accordingly, it is a principal object of the invention to provide a new and improved impulse responsive circuit.

Another object of the invention is to provide a new and improved circuit responsive to signal impulse groups made up of impulses concurrently arriving over a plurality of signal channels.

Yet another object of the invention is to provide a new and improved circuit for producing unique output signals or impulse trains in response to energizing impulse groups.

Still another object of the invention is to provide an impulse responsive circuit delivering timed output impulses or trains of impulses.

A further object of the invention is to provide an impulse responsive circuit having high reliability and accuracy of response.

Figure 1:
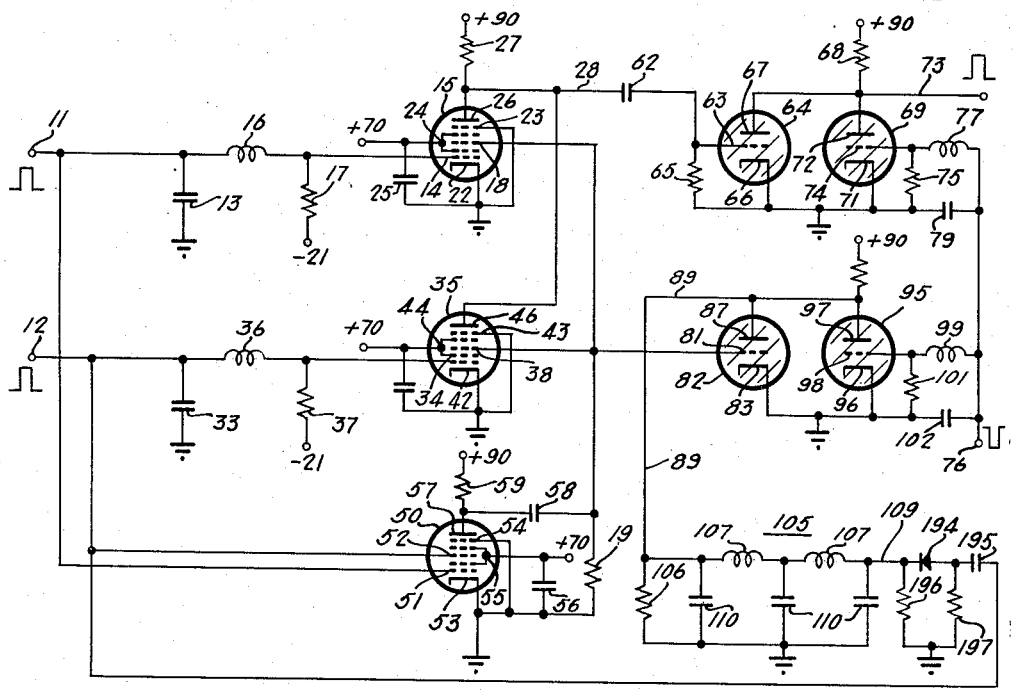
Figure 2:
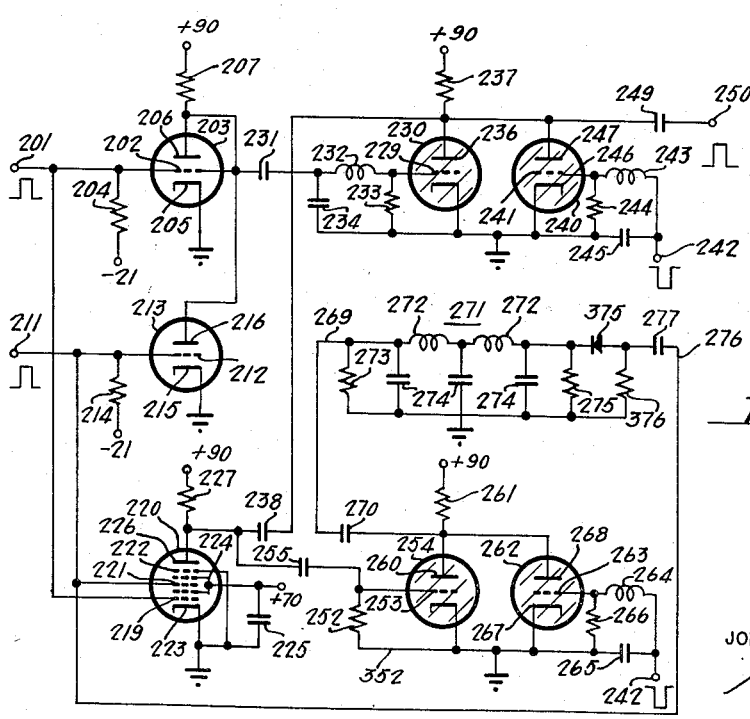

The foregoing and other objects of the invention will become more apparent as the following detailed description of the invention is read in conjunction with the drawings in which:

Figure 1 illustrates schematically an impulse responsive circuit embodying the invention, Figure 2 illustrates schematically a modified impulse responsive circuit embodying the invention, Figure 3 illustrates schematically another impulse responsive circuit adapted to receive negative impulses, and Figure 4 is a timing diagram illustrating the output signals corresponding to input signals to the circuit shown in Figures 1, 2 and 3.

In the annexed drawings like parts are identified by like reference characters and values of potential are given for purposes of illustration only and not in order to limit the scope of the invention.

For convenient reference, all supply buses are identified with a number corresponding with their voltage, even numbers being employed for positive voltages, and odd numbers for negative voltages.

Referring to Figure 1, numeral 11 designates an impulse receiving terminal. Terminal 11 may receive impulse trains having a predetermined nominal repetition rate which are characterized by the presence or absence of a positive-going impulse in given impulse positions. Likewise, an impulse receiving terminal 12 may receive an impulse train of the same nominal repetition rate also characterized by the absence or presence of a positive-going impulse in given impulse positions. Although different impulse trains may be received by the terminals 11 and 12, respectively, corresponding impulses should appear simultaneously and have equal durations.

Impulse receiving terminal 11 is returned to ground potential through a capacitor 13 and linked to the inner control electrode 14 of a buffer valve 15 through an inductor 16. The electrode 14 is negatively biased by its return to negative bus 21 by a grid resistor 17. The normally nonconducting buffer valve 15 is of conventional type commercially known as 6L7. The buffer valve 15 has its auxiliary control electrode 18 returned to ground through a resistor 19, and its cathode 22 and suppressor electrode 23 directly linked to ground potential, while its screen electrode 24 is linked to positive bus 70 and returned to ground through a bypass capacitor 25. The anode 26 of the buffer valve 15 is returned to positive bus 90 through an anode resistor 27.

The circuit which connects to impulse receiving terminal 12 is similar to the circuit connecting to impulse receiving terminal 11. A bypass capacitor 33 is bridged between the terminal 12 and ground, while an inductor 36 links terminal 12 with the inner control electrode 34 of a buffer valve 35. The buffer valve 35 which is normally nonconducting has its inner control electrode 34 returned to negative bus 21 through a grid resistor 37. The auxiliary control electrode 38 of buffer valve 35 is returned to ground potential through the resistor 19; the cathode 42 and suppressor electrode 43 are directly linked to ground potential; and the screen electrode 44 is joined to positive bus 70 and returned to ground potential through a bypass capacitor 45. The anode 46 of buffer valve 35 is joined to the anode 26 of buffing valve 15.

A conventional type gating valve 50 which is normally nonconducting has its inner control electrode 51 joined to the impulse receiving terminal 11, its auxiliary control electrode 52 linked to the impulse receiving terminal 12, and its cathode 53 and suppressor electrode 54 returned to ground potential. The screen electrode 55 of gating valve 50 is connected to positive bus 70 and returned to ground through a bypass capacitor 56 while the anode 57 is returned to positive bus 90 through the anode resistor 59 and further joined by means of a coupling capacitor 58 to the auxiliary control electrodes 18 and 38, respectively, of the buffer valves 15 and 35.

A positive impulse passing from impulse receiving terminal 11 to the inner control electrode 14 of the buffer valve 15 is delayed by the network comprising capacitor 13 and inductor 16. When received the current surge resulting through the anode circuit of buffer valve 15 develops a negative-going signal on its anode 26. This signal is delivered to the output line 28. With the removal of a positive signal impulse from the inner control electrode 14, the buffer valve 15 resumes its normal nonconductive state.

In a like manner, a positive impulse arriving from the impulse receiving terminal 12 is delivered to the inner control electrode 34 of the buffer valve 35 after a delay imposed by the network comprising capacitor 33 and inductor 36. The resulting conduction of the buffer valve 35 gives rise to a negative-going voltage upon the anode 46. This voltage signal is delivered to the output line 28. With the removal of the positive signal from the control electrode 34, the buffer valve 35 resumes its normal nonconductive state.

A positive-going signal upon the impulse receiving terminal 11 is also immediately delivered to the inner control electrode 51 of the normally nonconducting gate valve 50; while a positive impulse upon the impulse-receiving terminal 12 is immediately delivered to the auxiliary control electrode 52 of this valve. The gating valve 50 remains nonconductive except when positive-going impulses are concurrently delivered from terminals 11 and 12. In this case, the gating valve 50 becomes conductive. The current surge resulting through the anode resistor 59 produces a negative voltage excursion upon the anode 57. This negative-going impulse is passed through the coupling capacitor 58 to the auxiliary control electrodes 18 and 38 respectively, of buffer valves 15 and 35. The valves 15 and 35 are prevented from becoming conductive by the negative signal upon their auxiliary control electrodes 18 and 38 even though positive signals appear upon their inner control electrodes 14 and 34 respectively. It is noted that the negative signal delivered to the auxiliary control electrodes 18 and 38 of valves 15 and 35 arrives before positive signals are delivered to the inner control electrodes 14 and 34. This assures nonconductivity of the buffer valves 15 and 35. To further insure nonconductivity of the valves 15 and 35, the anode resistor 59 may have a high resistance which in combination with the series capacitance of the gating valve 59 forms a network having a relatively long time constant. Thus, when the positive signals are removed from the control electrodes 51 and 52 of the gating valve 50, the current flow through the anode resistor 59 decays slowly to prolong the duration of the negative signal upon the auxiliary control electrodes 18 and 38 of buffer valves 15 and 35.

The output line 28 is connected through a coupling capacitor 62 with the control electrode 63 of a normally conducting signal input valve 64; the control electrode 63 is returned to ground potential by means of a grid resistor 65. The signal input valve 64 has its cathode 66 joined to ground and its anode 67 returned to positive bus 90 through an anode resistor 68.

A signal timing valve 69 is normally conducting. It has its cathode 71 linked to ground while its anode 72 is connected to a signal output line 73 through a coupling capacitor 61 and joined to anode 67 of signal input valve 64. The control electrode 74 of the signal timing valve 69 is returned to ground through a grid resistor 75 and is also joined to a clock pulse terminal 76 through inductor 77. A capacitor 79 connects ground from the clock pulse terminal 76.

Signals appearing upon the signal output line 28 are delivered to the control electrode 63 of the signal input valve 64. Delivery of a negative impulse to the control electrode 63 renders the valve 64 nonconductive. However, the potential upon the anode 67 of valve 64 is not affected by its nonconductivity, as long as the signal timing valve 69 remains conductive. This is because current continues to flow through anode resistor 68 which is common to valves 64 and 69. When valve 69 is also rendered nonconductive by the delivery of a negative-going impulse to its control electrode 74, a positive-going impulse is delivered to the signal output line 73. This is because the current flow through anode resistor 68 is diminished and the voltage drop across it lowered by the concurrent nonconductivity of valves 64 and 69. When the signal timing valve 69 is nonconductive, the conductivity of the signal input valve 64 acts to prevent the delivery of positive-going signals to the signal output line 73.

The clock pulse terminal 76 receives negative pulses at a repetition rate which is equal to the nominal repetition rate of the signal arriving at impulse receiving terminals 11 and 12. The combination of capacitor 79 and inductor 77 acts to delay the arrival of a negative impulse from the clock pulse terminal 76 to the control electrode 74 of the signal timing valve 69. The delay imposed is sufficient to allow a negative impulse to arrive first upon the control electrode 63 of the signal input valve 64 (if such signal is delivered from signal output line 28). Under such circumstances, the signal input valve 64 is extinguished first, and the signal timing valve 69 is made nonconductive thereafter with the arrival of the negative clock pulse. In this manner, the clock pulses time the delivery of positive signals to line 73 which results upon the concurrent nonconductivity of valves 64 and 69.

Signals upon the anode 57 of the gating valve 50 are also delivered to the auxiliary control electrode 81 of a signal input valve 82 through the coupling capacitor 58. Valve 82 has its cathode 83 joined to ground. The anode 87 of signal input valve 82 is returned to positive bus 90 through an anode resistor 88 and joined to a signal output line 89 through a coupling capacitor 91.

The signal input valve 82 is normally conducting and is associated with a normally conducting signal timing valve 95.

The signal timing valve 95 has its cathode 96 joined to ground and its anode 97 linked to the anode 87 of the signal input valve 82. The control electrode 98 of the signal timing valve 95 is also connected to the signal output terminal of the clock pulse generator 76 through an inductor 99. The control electrode 98 of valve 95 is also returned to ground through a grid resistor 101.

A capacitor 102 is connected in parallel with the capacitor 79.

The operation of valves 82 and 95 is similar to the operation of valves 64 and 69 just described. A negative signal delivered to the auxiliary control electrode 81 of the signal input valve 82 from the anode 57 of gating valve 50 makes valve 82 nonconductive. A negative signal received thereafter by the control electrode 98 of the signal timing valve 95 makes valve 95 nonconductive. With both valves 82 and 95 nonconductive a positive-going impulse is delivered to the signal output line 89.

The signal output line 89 is connected to the input of a delay line 105 having an input resistor 106 connected to ground. The delay line 105 may comprise two series inductors 107 connected between the line 89 and a line 109, capacitors 110 connecting from the ends of the inductors 107 to ground potential. The delay line 105 imposes a delay on signals passing from line 89 to line 109 which is approximately one pulse period at the clock pulse repetition rate.

The signal output line 109 is returned to the impulse-receiving terminal 12 through a series-connected crystal diode 194 and a coupling capacitor 195. The diode 194 has its anode connected to output line 109 and is returned to ground potential through a resistor 197. The poling of the crystal diode 194 allows positive signal impulses on the line 109 to be passed to terminal 12.

In operation, the delivery of a positive-going impulse to the terminal 11, in the absence of a positive impulse upon the terminal 12, results, as already explained, in the delivery of a positive-going impulse upon the signal output line 73. In a like manner, the arrival of a positive-going impulse on the terminal 12, in the absence of a similar signal upon the impulse-receiving terminal 11, also results in the development of a timed positive-going signal impulse upon the output line 73. In the event that positive-going impulses arrive concurrently on both terminals 11 and 12, a positive-going impulse is not delivered over the output line 23. However, a positive-going signal is received by the signal output line 109 after a one-pulse period delay. This delayed positive impulse is passed through the crystal diode 194 and coupling capacitor 195 to the impulse-receiving terminal 12. If a positive-going impulse is also present upon the terminal 11 at this time, the cycle of events just described is repeated. That is, a positive-going signal is received by the signal output line 109 after a one-pulse period delay and is passed to the terminal 12.

Obviously in the case where an impulse is not delivered to terminal 11 when a negative impulse is received upon the terminal 12 from the delay line 105, a signal delivered to the buffer valve 35 develops a negative-going signal upon the output line 28, effecting the delivery of a positive-going impulse upon the output line 73.

Referring now to Figure 2 which shows a modified impulse responsive circuit, an impulse receiving terminal 201 is connected to the control electrode 202 of a buffer valve 203. The control electrode 202 of the valve 203 is negatively biased by returned through a grid resistor 204 to a negative bus 21. The buffing valve 203 which is normally non-conductive has its cathode 205 returned to ground potential and its anode 206 joined to a positive bus 90 through an anode resistor 207.

An impulse receiving terminal 211 is joined to the control electrode 212 of a buffer valve 213. The control electrode 212 of buffer valve 213 is negatively biased by its return to the negative bus 21 through a grid resistor 214. The buffer valve 213 which is normally non-conducting has its cathode 215 returned to ground potential and its anode 216 linked to the anode 206 of the buffer valve 203.

The impulse receiving terminal 201 is also joined to the inner control electrode 219 of a signal gating valve 220, and the impulse receiving terminal 211 is connected to the auxiliary control electrode 221 of this valve. The signal buffer valve 220 which is normally non-conductive has its suppressor electrode 222 and cathode 223 linked to ground potential, its screen electrode 224 joined to a positive bus 70 and bypassed to ground through a capacitor 225, and its anode 226 returned to the positive bus 90 through an anode resistor 227.

The anodes 206 and 216, respectively, of buffer valves 203 and 213, connect with the control electrode 229 of a signal input valve 230 through a series connected coupling capacitor 231 and an inductor 232. The control electrode end of inductor 232 is connected to ground through a grid resistor 233, while its other end is joined to ground by an input capacitor 234. The signal input valve 230 which is normally conducting has its cathode 235 grounded and its anode 236 joined to positive bus 90 by means of an anode resistor 237. The anode 236 of valve 230 is also linked to the anode 226 of the gating valve 220 by means of a coupling capacitor 232.

A signal timing valve 240 associated with the signal input valve 230 has its control electrode 241 connected with a clock pulse terminal 242 through an inductor 243. The control electrode end of inductor 243 is returned to ground through a grid resistor 244 while its other end is passed to ground through an input capacitor 245. The signal timing valve 240 which is normally conducting has its cathode 246 linked to ground and its anode 247 joined to the anode 236 of the signal input valve 230. Anode 247 of valve 240 is further coupled to a signal line 250 by means of a coupling capacitor 249.

The impulse receiving terminal 201 may receive impulse trains having a given repetition rate and which are characterized by the presence or absence of a positive-going impulse in given impulse positions. Likewise, terminal 211 may receive an impulse train of the same repetition rate also characterized by the absence or presence of a positive-going impulse in given impulse positions. The presence of a positive impulse upon terminal 201 makes buffer valve 203 conductive to produce a negative-going signal in its anode circuit. This negative-going signal is delivered to the control electrode 229 of the signal input valve 230 to make it nonconductive. In a similar manner, a positive-going signal upon the terminal 211 renders buffer valve 213 conductive to develop a negative-going signal in this anode circuit. This negative signal likewise drives the signal input valve 230 to cutoff. When the signal receiving valve 230 is nonconductive due to the presence of a positive-going impulse upon one of the terminals 201 or 211, cutoff of signal timing valve 240 causes delivery of a positive-going signal to the output line 250. The signal timing valve 240 is cut off by each negative clock pulse that arrives from terminal 242. The clock pulse repetition rate is the same as the repetition rate of the signal trains delivered to terminals 201 and 211.

When positive impulses are received by terminal 201 and 211 at the same time, the positive swing of electrodes 219 and 221 renders the signal gating valve 220 conductive. Upon conduction, a negative signal is developed upon the anode 226 of valve 220. This negative signal is delivered to the anodes 236 and 247, respectively, of valves 230 and 240, to prevent their positive excursion, thereby inhibiting the delivery of a positive-going signal to the line 250. This suppression of an output signal on line 250 is assured by the inductor 232 and capacitor 234 which delay the delivery of the negative-going impulse from the buffer valves 203 and 213 to the control electrode 229 of the signal input valve 230. This allows the prior arrival of the suppressing signal. Furthermore, the suppressing signal delivered by the gating valve 220 may be prolonged so that it remains present until after the negative signal has been removed from the control electrode 229 of input valve 230. This prolonged signal may easily be obtained as follows: Make the resistance of the anode resistor 227 sufficiently high so that its combination in series with the capacitance of the gating valve 220 forms a network having a relatively long time constant.

The clock pulses on terminal 242 are delayed by the combination of inductor 243 and capacitor 245 before reaching the input electrode 241 of timing valve 240. The clock pulse is delivered to the input of valve 240 after the input signal is received by valve 230 in order to time the signal output to line 250.

The anode 226 of the signal gating valve 220 is also coupled to the control electrode 253 of a signal input valve 254 by means of a coupling capacitor 255. The electrode 253 is also returned to ground through a grid resistor 252. The input valve 254 which is normally conducting has its cathode 257 directly linked to ground and its anode 260 returned to positive bus 90 by means of an anode resistor 261.

A normally conducting signal timing valve 262 is associated with the signal input valve 254. The control electrode 263 of the signal input valve 262 receives negative clock pulses from the terminal 242 through a delay network comprising an inductor 264 and an input capacitor 265. The said control electrode 263 also is returned to ground by means of a grid resistor 266. The cathode 267 of valve 262 is grounded while the anode 268 is linked to anode 260 of valve 254 and joined to a signal line 269 through a coupling capacitor 270.

A negative-going impulse developed in the anode circuit of gating valve 220 is also delivered to the auxiliary control electrode 253 of signal input valve 254 to make it nonconductive. Shortly thereafter, the signal timing valve 262 receives a negative clock pulse cutting it off. This results in the delivery of a positive-going signal to the line 269.

The signal line 269 is connected to the input of the delay line 271. Delay line 271 comprises series inductors 272, an input resistor 273 bridging the input end to ground, an output resistor 275 bridging the output end to ground, and delay capacitors each connecting an inductor end to ground. The output of delay line 271 connects to the signal line 276 through a coupling capacitor 277.

The delay line 271 passes signals appearing on line 269 to line 276 and imposes a delay of approximately one pulse period at said given repetition rate.

Thus, if a positive impulse arrives at the terminal 201, a positive impulse will be delivered to the line 250. If a positive impulse arrives upon the terminal 211, a positive impulse also is delivered to the line 250. If, however, positive impulses appear on the terminals 201 and 211 at the same time, an impulse will not be delivered to the line 250. However, a positive impulse will be delivered to the line 276 one pulse period later.

The signal line 276 is returned to the impulse receiving terminal 211 and a crystal diode 375 is connected between the delay line 271 and the coupling capacitor 277. The crystal diode 375 is poled to allow the passage of positive impulses from delay line 271 to the signal line 276. The cathode of crystal diode 275 is returned to ground by means of a resistor 376. The output response of this circuit to input signals is similar to that of the responsive circuit shown in Figure 1.

The impulse responsive circuit shown in Figure 3 is adapted to receive trains of negative-going impulses upon its impulse receiving terminals 401 and 402. The impulse trains which arrive upon terminals 401 and 402 have the same repetition rate and are characterized by the presence or absence of a negative impulse in given impulse positions.

Terminal 401 is connected to ground through a grid resistor 403 and joined to the inner control electrode 404 of signal buffer valve 405. The impulse receiving terminal 402 is also returned to ground through a grid resistor 406 and joined to the auxiliary electrode 407 of the buffer valve 405. The signal buffer valve 405 which is normally conducting has its suppressor electrode 408 and cathode 409 grounded, and its screen electrode 410 linked to a positive bus 70 and returned to ground through a by-pass capacitor 411. The anode 412 of valve 405 returns to a positive bus 90 through an anode resistor 413 and is also connected to the control electrode 416 of a signal inverting valve 417 by means of a coupling capacitor 414 through a delay network 415. The delay network 415 comprises an inductor and an input capacitor 427 bridge to ground from the input end of said inductor.

The inverting valve 417 which is normally nonconducting has its control electrode negatively biased by returning to a negative bus 9, and its cathode grounded. The anode of inverting valve 417 connects to positive bus 90 through an anode resistor 419, and is also joined to a signal line 421 by means of a coupling capacitor 420.

The arrival of a negative impulse upon either one of the impulse receiving terminals 401 and 402 renders the signal buffer valve 405 nonconductive to develop a positive voltage excursion upon the anode 412. This positive impulse is delivered to the control electrode of inverting valve 417 which becomes conductive and delivers a negative-going impulse to the signal line 421. The signal input terminals 401 and 402 are also connected respectively to the control electrodes 420 and 430 of a pair of parallel connected gating valves 422 and 432. The gating valves 422 and 432 which are normally conducting have their cathodes 423, 433, grounded and their anodes 424, 434 returned to positive bus 90 through an anode resistor 435.

A normally nonconducting signal inverting valve 438 has its control electrode 439 joined to the anodes 424, 434 of the gating valves 422 and 432 by means of a coupling resistor 440. The control electrode 439 of valve 438 is negatively biased by returning to negative bus 301 through a grid resistor 441.

The cathode of signal inverting valve 438 is grounded, while the anode 442 is linked to positive bus 90 through an anode resistor 443 and joined to the control electrode 416 of inverting valve 417 by means of a coupling capacitor 444.

If negative signal impulses do not arrive upon both of the terminals 401 and 402 at the same time, at least one of the gating valves 422, 432 remains conductive. This prevents a positive voltage excursion of the anodes 424 and 434 of valves 422 and 432. However, when negative impulses arrive upon both of the terminals 401 and 402 at the same time, both gating valves 422 and 432 are concurrently cut off to produce a positive-going voltage excursion upon their anodes 424, 434.

The delivery of a positive-going impulse to the control electrode 439 of inverting valve 438 produces a current surge in the anode circuit of this valve. The resulting negative voltage excursion upon anode 442 of the signal inverting valve 438 is delivered to the control electrode 416 of inverting valve 417. This prevents the positive excursion of control electrode 416 due to delivery of a positive impulse from the output of the buffer valve 405. The delay network 415 assures the suppression of the positive impulse to valve 417 from buffer valve 405 by delaying its delivery until after a negative impulse has arrived at valve 417 from inverting valve 438. Furthermore, the duration of the negative suppressing impulse from valve 438 is prolonged by making the value of the anode resistor 443 sufficiently high. Thus, the negative suppressing impulse delivered to valve 417 will not be removed therefrom until after the removal of the positive impulse delivered from valve 405. All this prevents the delivery of a negative impulse to the signal line 421.

The anodes 424 and 434 respectively of signal gating valves 422 and 432 are also connected to the control electrode 448 of a signal input valve 450 by means of a coupling capacitor 451. Signal input valve 450 which is normally nonconducting has its control electrode 448 negatively biased by its return to negative bus 9 through a grid resistor 449. The cathode 453 of valve 450 is grounded. The anode 456 of input valve 450 connects to positive bus 90 through an anode resistor 457 and is coupled to a signal line 461 through a delay line 458 by connecting to the input thereof.

The delay line 458 comprises a plurality of series connected inductors 459, an input resistor 462 bridging to ground the input end of said inductors 459, and a plurality of capacitors 460 each connecting the end of an inductor 459 to ground. The output end of delay line 458 connects to signal line 461.

When both gating valves 422 and 432 become nonconductive at the same time, a positive-going signal developed upon their anodes 424 and 434 is delivered to the inner control electrode 448 of signal input valve 450. The valve 450 becomes conductive producing a negative-going signal upon its anode 456. This negative signal is delivered to the signal line 461 after a delay of approximately one pulse period at the given repetition rate. This delay is imposed by the delay line 458.

Thus, if a negative impulse is delivered to either of the impulse receiving terminals 401, 402 but not to both, a negative impulse is delivered to the signal line 421. If negative impulses arrive upon both impulse-receiving terminals 401 and 402 at the same time, a signal is not delivered to line 421, however, a negative impulse is delivered to the signal line 461 after a one impulse period delay.

The signal line 461 is returned to the impulse receiving terminal 402 and a crystal diode 470 is connected between the delay line 458 and the signal line 461. The crystal diode 470 is poled to allow the passage of negative signal impulses from the delay line 458 to the signal line 461.

The cathode of the crystal diode 470 is returned to ground by means of a delay line terminating resistor 471. The output response of this circuit to input impulse signals is similar to that of the responsive circuits shown in Figures 1 and 2.

The circuits shown in Figures 1, 2 and 3 each have two input terminals and an output terminal. Each of these circuits, although different from the other, is responsive to deliver similar output signals when each receives the same input signals. The output signal, however, is determined by the input signals received. When the impulse responsive circuits are used to receive a group of impulses characterized by the presence and absence of impulses in certain of the pulse positions over a first one of their input terminals, and a single pulse in a predetermined pulse position over the second one of its input terminals, the output terminal of the device delivers a signal uniquely determined by the input signals. This property of the apparatus which is very useful is illustrated by Figure 4.

Figure 4A shows a group of impulses received by the first input terminal of a responsive circuit, of the type here described, having pulses in the first, second, third, fifth, seventh, and eighth pulse positions. The impulse received by the second input terminal of said device is illustrated in the third pulse position, and may be received in any of the other pulse positions. The resulting signal delivered at the output terminal contains impulses in the first, second, fourth, fifth, seventh, and eighth pulse positions. Referring back to the operation of the impulse responsive circuit, the delivery of this particular output signal will be obvious. With receipt of an impulse in pulse position 1 over the first input terminal, an impulse is delivered to the output terminal. Similarly, an impulse is delivered to the output terminal for pulse position two. For receipt of concurrent impulses over the first and second input terminals in pulse position 3 no signal is delivered to the output terminal. However, after a delay of one pulse period an impulse is delivered by the device to the second input terminal and is shown in dash outline in pulse position 4. The absence of an impulse delivered to the first input terminal in pulse position 4 results in an impulse delivered to the output terminal in pulse position 4. With the absence of an impulse to the second input terminal in pulse positions 5, 6, 7 and 8, the presence of an impulse in these pulse positions on the first input terminal results in impulses delivered to the output terminal in like pulse positions.

The impulse responsive circuits described are also particularly useful in connection with equipment used for numerical electrical computing. For example, a group of impulses may be used to represent a number in binary form. The presence of an impulse in a given pulse position may be used to represent the numeral 1 (one), while the absence of an impulse in a given impulse position may be used to indicate the numeral 0 (zero). Thus, the group of impulses delivered to the first input terminal shown in Figure 4B may be used to represent the binary number 11010111, the least significant figure appearing in pulse position 1. The impulse delivered to the second input terminal in pulse position 1, represents the binary number 1 (one). However, if an impulse were delivered to the second input terminal in pulse position 2, 3, 4, etc., the corresponding binary number represented would be 10, 100, 1000, etc., respectively. The binary correspondence of the impulses delivered over the output terminal shown in Figure 4B is 11011000.

The output signals delivered to the output terminal as shown in Figure 4B are also in correspondence with the signals delivered to the first and second input terminals when considered in connection with the described operation of an impulse responsive device. The presence of impulses upon the first and second input terminals in pulse position 1 results in the absence of an output impulse in that position. However, the device delivers an impulse to the second input terminal in pulse position 2 shown in dashed lines. The presence of impulses upon the first and second input terminals in pulse position 2 likewise results in the absence of an output impulse and delivery of an impulse to the second input terminal in pulse position 3 (shown in dashed lines). The presence of an impulse upon the first input terminal in pulse position 3 likewise results in the absence of an output impulse in that position and the delivery of an impulse to the second input terminal in pulse position 4. The absence of an impulse to the first input terminal in pulse position 4 results in the delivery of an output impulse in this position. The absence of impulses to the second input terminal in pulse positions 5, 6, 7, and 8 results in the delivery of an output impulse in the pulse positions wherein an input impulse is delivered to the first input terminal.

It may now be noted, as illustrated by Figure 4, that signal trains upon the first and second input terminals representing binary numbers cause the apparatus to produce an output signal train representing their binary sum. Thus, as shown in Figure 4B, which illustrates an impulse delivered to the second input terminal in pulse position 1, the binary number represented by the output signal is increased by one over the number represented by the impulse train delivered to the first input terminal. Those versed in the computer art are aware of the general and particular utility of a device producing output signals representing the sum of numbers represented by the input signals.

While only a few representative embodiments of apparatus for practicing the inventions disclosed herein have been outlined in detail, there will be obvious to those skilled in the art, many modifications and variations accomplishing the foregoing objects and realizing many or all of the advantages, but which yet do not depart essentially from the spirit of the invention.

What is claimed is:

1. In an impulse responsive network, a circuit comprising first and second input conductors adapted to receive stimuli and first and second output conductors, said first output conductor being energized upon the occurrence of stimuli on only one of said input conductors, said second output conductor being energized at a predetermined time after the concurrence of stimuli upon both of said input conductors, and an additional connection between said second output conductor and said second input conductor of said circuit.

2. In an impulse responsive network, a circuit comprising first and second input conductors adapted to receive stimuli and first and second output conductors, said first output conductor being energized upon the occurrence of stimuli on only one of said input conductors, said second output conductor being energized upon the concurrence of stimuli upon both of said input conductors, a delay element having an input lead operatively connecting with the second output conductor of said circuit and an output lead, and a connection between the output lead of said delay element and the second input conductor of said circuit.

3. In an impulse responsive network, a circuit comprising first and second input conductors adapted to receive stimuli and first and second output conductors, said first output conductor being energized upon the occurrence of stimuli on only one of said input conductors, said second output conductor being energized at a predetermined time after the concurrence of stimuli upon both of said input conductors, a gating device conditionally passing stimuli comprising a first input lead connected to the first output conductor of said circuit a second input lead connected to the second output conductor of said circuit and first and second output leads, a signal source conditioning said gating device for signal passage, and a connection between the second output lead of said gating device and the second input conductor of said circuit.

4. In an impulse responsive network, a circuit comprising first and second input conductors adapted to receive stimuli and first and second output conductors, said first output conductor being energized upon the occurrence of stimuli on only one of said input conductors, said second output conductor being energized upon the concurrence of stimuli upon both of said input conductors, a gating device conditionally passing stimuli comprising a first input lead connected to the first output conductor of said circuit a second input lead connected to the second output conductor of said circuit and first and second output leads, a signal source conditioning said gating device for signal passage, a delay element having an input lead connected to the second output lead of said gating device and an output lead, and a connection between the output lead of said delay element and the second input conductor of said circuit.

5. In combination, a first signal input line, a second signal input line, a first buffer connection comprising an input conductor connected to said first signal input line and an output conductor, a second buffer connection comprising an input conductor connected to said second signal input line and an output conductor, a signal output line connected to the output conductors of said first and second buffer connections, a gating connection comprising first and second signal input lines and an output coductor, said gating connection upon the concurrence of stimuli on said first and second signal lines energizing it output conductor and inhibiting stimulation of said sigal output line, a delay element having an input lead connected to the output conductor of said gating connection and an output lead, and an operative connection between the output lead of said delay element and the second signal input line.

6. In combination, a first signal input line, a first buffer valve comprising a first control electrode a second control electrode and an output electrode, a first delay element connected between said first signal input line and the first control electrode of said first buffer valve, a second signal input line, a second buffer valve comprising a first control electrode a second control electrode and an output electrode, a second delay element connected between said second signal input line and the first control electrode of said second buffer valve, a signal output line connecting with the output electrodes of said first and second buffer valves, a gating valve comprising a first control electrode connected with said first signal input line a second control electrode connecting with said second signal input line and an output electrode connected with the second control electrodes of said first and second buffer valves, said gating valve upon the concurrence of stimuli upon said first and second signal input lines energizing its output electrode to inhibit stimulation of said signal output line, a third delay element having an input lead connected to the output electrode of said gating valve and an output lead, and a connection between the output lead of said third delay element and the second signal input line.

7. In combination, a first signal line, a second signal line, a first buffer valve comprising a control electrode operatively connecting with said first signal line and an output electrode, a second buffer valve comprising a control electrode operatively connecting with said second signal line and an output electrode, a first signal link comprising an electrode structure including a control member and an output member, a first delay element operatively connected between the output electrodes of said first and second buffer valves and the control member of said first signal ling, a second signal link having an input member and an output member, a gating valve comprising a first control electrode connecting with said first signal line a second control electrode connecting with said second signal line and an output electrode connecting with the output member of said first signal link and with the input member of said second signal link, said gating valve upon the concurrence of stimuli upon said first and second signal lines energizing said second signal link and inhibiting stimuli upon the output member of said first signal link, a second delay element having an input lead connected with the output member of said second signal link and an output lead, and a connection between the output lead of said second delay element and said second signal line.

8. In combination, a first signal line, a second signal line, a buffer connection having a pair of input elements respectively connecting with said first and second signal lines and an output element, a first coupling connection comprising an input member connecting with said first signal line and an output member, a second coupling connection comprising an input member connecting with said second signal line and an output member, an inverting connection comprising an input member connecting with the output members of said first and second coupling connections and an output member connecting with the output element of said buffer connection, and a unilateral transfer delay link connecting between the output members of said first and second coupling connections and the second signal line.

9. In combination, a first signal input line, a second input signal line, a signal output line, a buffer valve comprising a first control electrode connecting with said first signal input line a second control electrode connecting with said second signal input line and an output electrode, a first delay element connecting between the output electrode of said buffer valve and said signal output line, a first coupling valve comprising a control electrode connecting with said first signal input line and an output electrode, a second coupling valve comprising a control electrode connecting with said second signal input line and an output electrode, a signal inverting valve comprising a control electrode connecting with the output electrodes of said first and second coupling valves and an output electrode coupled with said signal output line, a second delay element having an input lead connecting with the output electrodes of said first and second coupling valves and an output lead, and a connection between the output lead of said second delay element and said second signal input line.

JOHN PRESPER ECKERT, JR.
JOHN W. MAUCHLY.

References Cited in the file of this patent

UNITED STATES PATENTS

| Number | Name | Date |
|---|---|---|
| 2,464,353 | Smith et al. | Mar. 15, 1949 |